United States Patent [19]

Henson

[11] 4,336,783
[45] Jun. 29, 1982

[54] FUEL VAPORIZER CARBURETOR FOR INTERNAL COMBUSTION ENGINE

[76] Inventor: Walter M. Henson, 1212 Major Dr., No. 1, North, Beaumont, Tex. 77701

[21] Appl. No.: 161,219

[22] Filed: Jun. 19, 1980

[51] Int. Cl.$^3$ .................. F02M 31/00; F22B 37/10
[52] U.S. Cl. ................................. 123/557; 123/546; 123/547; 123/198 D; 261/142; 261/DIG. 83; 261/DIG. 6
[58] Field of Search ............... 123/546, 547, 557, 523, 123/524, 525, 529, 198 D; 261/DIG. 83, DIG. 6, 142, 102, 18 A

[56] References Cited

U.S. PATENT DOCUMENTS

| | | | |
|---|---|---|---|
| Re. 26,186 | 4/1967 | McQuerry | 123/557 |
| 533,275 | 1/1895 | Collet et al. | 261/103 |
| 775,859 | 11/1904 | Russell | 261/DIG. 83 |
| 951,590 | 3/1910 | Brown | 261/DIG. 83 |
| 1,062,981 | 5/1913 | Lynde | 261/DIG. 83 |
| 2,882,882 | 4/1959 | Pantano | 123/523 |
| 2,905,800 | 9/1959 | Goechad | 261/DIG. 83 |
| 3,107,657 | 10/1963 | Cook | 261/18 A |
| 3,792,688 | 2/1974 | Grainger | 261/DIG. 83 |
| 3,892,547 | 7/1975 | Tucker | 261/DIG. 6 |
| 3,927,656 | 12/1975 | Reed et al. | 123/529 |
| 4,213,433 | 7/1980 | Day | 261/142 |
| 4,259,937 | 4/1981 | Elliott | 123/557 |
| 4,276,804 | 7/1981 | Waschkaltis | 123/557 |

Primary Examiner—Raymond A. Nelli
Attorney, Agent, or Firm—Dennis T. Griggs

[57] ABSTRACT

A fuel vaporizer carburetor provides a continuous mixture of vaporized fuel and combustion air for operation of an internal combustion engine to meet the requirements of a wide range of engine operating conditions. Fuel vapor and combustion air undergo turbulent intermixing in an elongated mixing chamber. The mixing chamber is enclosed by a tubular wick of fiber mesh material which is saturated with fuel vapors and fuel condensate. The fuel vapors are generated by heating fuel in a float bowl which underlies the wick. Combustion air is admitted through a plurality of angularly spaced openings and is conducted through the porous flow passage provided by the tubular wick prior to entry into the mixing chamber. This arrangement produces a cyclonic, whirling movement which promotes intermixing of the combustion air and fuel vapors. Turbulence is induced at an intermediate point in the mixing chamber by a tapered sidewall housing section. The flow rate of the combustion air is limited by spring-loaded closure plates mounted over the inlet openings.

2 Claims, 4 Drawing Figures

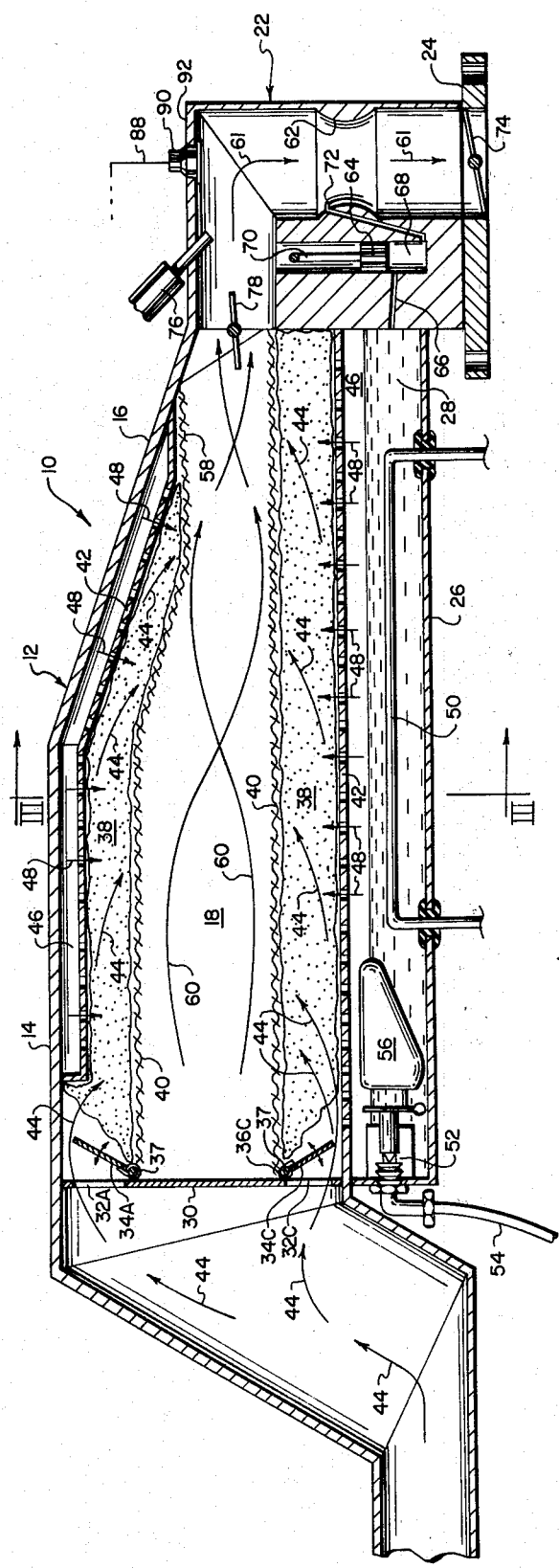
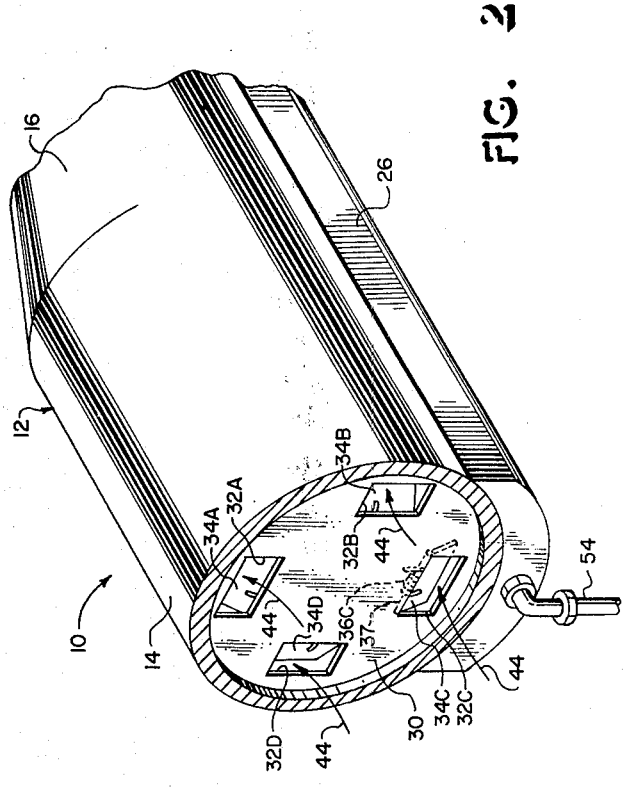

FUEL VAPORIZER CARBURETOR FOR INTERNAL COMBUSTION ENGINE

BACKGROUND OF THE INVENTION

1. Field of the Invention:

The present invention relates generally to internal combustion engines, and in particular to fuel vaporizer carburetors.

2. Description of the Prior Art:

In an internal combustion engine, the function of the carburetor is to produce a combustible fuel-and-air mixture. The combustible mixture may comprise an aerosol mixture of tiny droplets of fuel entrained in a stream of air, or may be a homogeneous mixture of vaporized fuel and air. In carburetors which produce an aerosol mixture, fuel is atomized in a stream of combustion air with the assistance of a venturi. As a result of heat absorption on the way to the cylinder, these droplets are vaporized, so that the mixture thus becomes a flammable gas. The efficiency of the engine is directly related to the amount of energy released by combustion of a given volume of gas/air mixture within the cylinder. The primary purpose of the conventional carburetor is to mix the gasoline droplets uniformly with intake air in the proper proportions to produce a uniform aerosol mixture with the goal of obtaining complete combustion.

In the operation of conventional carburetors, liquid fuel is aspirated from a choke tube by the suction developed within a venturi region of the carburetor air passage. The aspiration of the fuel within this relatively low pressure region causes the fuel to be finely divided into tiny droplets that are carried along in a moving air mass to the cylinder. The size of each fuel droplet produced for a given pressure and airflow rate is dependent upon the viscosity of the fuel, and the viscosity of tthe fuel, is dependent upon its temperature. It will be appreciated that at relatively low temperatures, the fuel droplets will be larger and will be less uniformly distributed throughout the moving air mixture, thereby leading to incomplete combustion. Conversely, it will also be appreciated that as the temperature of the fuel is increased, the fuel droplets constantly diminish in size until fuel vapor is produced.

It is well known that a liquid fuel may be heated and converted to a vapor for mixture with air to establish a combustible air/fuel mixture for delivery to an internal combustion engine. It is generally recognized that increased efficiency is obtainable through the use of a carburetor which produces vaporized fuel. In the conventional carburetor, liquid fuel is mixed with incoming air and flows to the combustion chamber as a wet aerosol mist through the intake manifold. A large percentage of the fuel droplets coat the intake manifold or combustion chamber walls and are blown into the exhaust manifold due to intake-exhaust overlap. The combustion reaction takes place when a molecule of oxygen links with a similar molecule of fuel by coupling of the outer valence rings. This coupling can only be accomplished when the fuel and oxydizer have been vaporized to a dry gas. A liquid fuel droplet can only vaporize on the interfacing surface with the oxydizer. Energy released is greatly restricted, and because of the high temperatures associated with the combustion, the liquid fuel which does not burn forms nitrous oxides and hydrocarbon waste products which give rise to air pollution. By vaporizing the liquid fuel, the mixing takes place inside the intake manifold, permitting instantaneous, efficient ignition in the combustion chamber.

OBJECTS OF THE INVENTION

Two factors which have limited widespread use of fuel vaporizer carburetors is the ability of the carburetor to produce an adequate volume of fuel vapor, and its ability to mix the fuel vapor with incoming air in the correct proportions to satisfy a wide range of engine operation conditions.

It is therefore, the principle object of the present invention to provide a fuel vaporizer carburetor which is capable of producing an adequate volume of vaporized fuel to satisfy a wide range of engine operating and loading conditions.

A related object of the invention is to provide a fuel vaporizer carburetor which automatically regulates the flow rate of the incoming combustion air according to a wide range of engine operating and loading conditions.

Yet another object of the invention is to provide a fuel vaporizor carburetor which is capable of producing a uniform mixture of incoming combustion air and fuel vapor.

Still another object of the invention is to provide a safety closure for sealing the carburetor and isolating it from flames propagated by a backfire through the intake manifold.

SUMMARY OF THE INVENTION

The foregoing objects are achieved in a fuel vaporizer carburetor having an elongated mixing chamber enclosed by a tubular, fluid permeable wick. The wick is continuously saturated with fuel vapor and fuel condensate from a fuel reservoir which is situated beneath one side of the wick. Fuel within the float reservoir is vaporized by an electrically energized heating element. The vaporized fuel circulates around the tubular wick and penetrates it prior to entry into the mixing chamber, with the result that the wick becomes saturated with vaporized fuel and fuel condensate. The porous, fluid permeable wick is enclosed on one side by a perforated tubular liner, and on the inside by a screen. The fluid permeable wick defines a fluid flow passage which has slightly less resistance to flow than does the perforated tubular liner. Incoming combustion air is directed axially into the end of the wick whereby it flows substantially along the length of the wick prior to passing through the screen and into the mixing chamber. According to this arrangement, the incoming air and vaporized fuel undergo partial mixing as they enter the mixing chamber. The incoming combustion air is preferably admitted through inlet ports which are angularly spaced with respect to each other around the end of the wick. By this arrangement, a swirling, cyclonic movement of the incoming air is induced, thereby promoting its mixture with fuel vapors. The mixing action is further enhanced by a tapered sidewall section of the wick which defines a flow restriction, thereby inducing turbulence in the swirling mixture prior to discharge from the mixing chamber.

Isolation of the mixing chamber will respect to flames propagated as the result of a backfire is provided by a light sensitive transducer which generates a control signal in response to light emitted by flames propagated from the intake manifold. A control signal generated by the photosensor operates a solenoid actuator which is coupled to a safety closure butterfly valve which is rotatably mounted in the discharge throat of the mixing chamber.

Flow rate control of the intake combustion air is regulated by spring-loaded closure doors which are moveably coupled to the combustion air inlet ports. The vacuum induced in the mixing chamber by the intake manifold causes deflection of the closure doors, thereby admitting combustion air.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 1 is a side view, in section, of a fuel vaporizer carburetor constructed according to the teachings of the invention;

FIG. 2 is a perspective view, partly in section, and partly broken away, of the fuel vaporizer carburetor shown in FIG. 1;

DESCRIPTION OF THE PREFERRED EMBODIMENT

Figure 3:
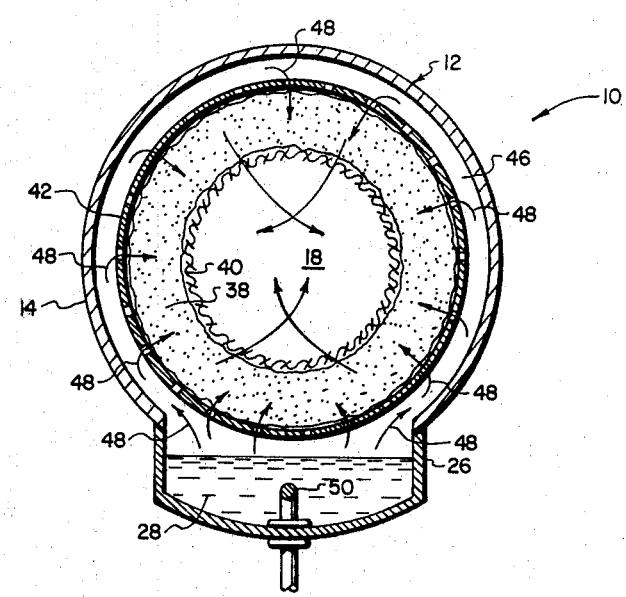
FIG. 3 is a sectional view of the fuel vaporizer carburetor taken along the lines III—III of FIG. 1.

In the description which follows, like parts are marked throughout the specification and drawing with the same reference numerals, respectively. The drawings are not necessarily to scale and in some instances portions have been exaggerated in order to more clearly depict certain features of the invention.

Referring now to FIGS. 1, 2 and 3, a fuel vaporizer carburetor 10 is enclosed in a tubular housing 12 having an elongated, generally cylindrical sidewall portion 14 and a tapered sidewall portion 16 which enclose an elongated air/fuel vapor mixing chamber 18. Secured to the inlet end of the tubular housing 12 is a combustion air conduit 20 which is coupled to an air cleaner assembly (not shown). Attached to the opposite end of the tubular housing 12 is a venturi assembly 22 including a flange 24 for attachment to the intake manifold of an internal combustion engine (not shown). Secured to the underside of the tubular housing 12 is a float bowl 26 for receiving a volume of liquid fuel 28.

The flow of combustion air into the mixing chamber 18 is partially blocked by a plate 30. Disposed around the periphery of the plate are four inlet port openings 32A, 32B, 32C and 32D. Coupled in hinged engagement with the plate 30 and overlying each inlet port opening are closures 34A, 34B, 34C and 34D, respectively. Each closure is biased toward the closed position by a spring 36A, 36B, 36C and 36D, respectively. Each closure is pivotally mounted for rotation about a shaft 37 in response to a partial vacuum induced through the intake manifold. According to this arrangement, the volume of combustion air admitted into the inlet chamber 18 increases and decreases in proportion to the vacuum induced by the intake manifold.

Received within the tubular housing 12 and encircling the mixing chamber 18 is a wick 38 of fiber mesh material which is non-reactive to the fuel 28. The wick 38 is confined between a tubular screen 40 and a perforated tubular liner 42. The end of the fiber mesh wick 38 is in alignment with the inlet ports 32A, 32B, 32C and 32D, thereby defining an elongated, annular porous transmission path through which the combustion air travels, as indicated by the arrows 44, prior to entry into the mixing chamber 18.

The concentric assembly of the perforated liner 42, the fiber mesh wick 38 and the inner screen 40 defines a fluid permeable, porous partition between the float bowl 26 and the mixing chamber 18. The wick 38 preferably has slightly less resistance to fluid flow as compared with the flow resistance of the perforated liner 42, whereby the combustion air is directed through a substantial portion of the wick prior to entering the mixing chamber. According to a preferred embodiment of the invention, the perforated tubular liner 42 is radially spaced with respect to the housing 12, thereby defining an annular flow passage 46 completely surrounding the wick assembly. The purpose of this arrangement is to expose and uniformly saturate the wick 38 with fuel vapors which rise from the float bowl as indicated by the arrows 48 (FIG. 3). The annular flow passage 46 is sealed with respect to incoming combustion air 44 so that combustion air and fuel vapors are drawn simultaneously through the wick 38.

Fuel such as gasoline vaporizes naturally at ambient temperatures. However, the volume of fuel vapor required for most engine operating conditions greatly exceeds the amount of vapor produced under natural, ambient conditions. Therefore, an electrically energized, resistance heating element 50 is lodged within the float bowl 26 for heat transfer to the fuel 28. Typically, the fuel is gasoline and is heated to a temperature of about 175° to about 185° Farenheit. The heat transfer rate is determined by the properties of the fuel 28, by the engine operating conditions, and is controlled by suitable circuitry (not shown). The volume of fuel 28 in the float bowl 26 is maintained essentially at a constant level by a needle valve 52 which is moveably coupled to the discharge port of a fuel delivery line 54 by means of a float 56 in the usual manner.

As electrical current is applied to the heating element 50, heat is transferred to the surrounding fuel 28, thereby accelerating the production of fuel vapor. The fuel vapor 48 rises and circulates through the annular flow passage 46 surrounding the wick assembly 38 and is drawn through the wick 38 into the mixing chamber 18 by the partial vacuum induced by the intake manifold through the venturi assembly 22. According to this arrangement, the wick 38 becomes saturated with hot fuel vapor and fuel condensate which is mixed with the incoming combustion air 44 as it flows through the wick 38 and into the mixing chamber 18. The wick 38 is heated by the hot fuel vapor 48 as it circulates through the annular flow passage 46.

It is generally desirable to mix the combustion air very thoroughly with the fuel vapor to produce a uniform mixture prior to discharge into the intake manifold. Because the incoming air is relatively dense with respect to the fuel vapors, complete mixing of the combustion air with the gas will not occur in the mixing chamber 18 without assistance because of the relatively short residence time of the gases flowing through the chamber. According to an important feature of the invention, thorough intermixing of the combustion air with the fuel vapors is carried out by inducing a swirling, cyclonic motion of the combustion air and gas within the mixing chamber 18. This swirling motion is produced in part by the inlet port openings 32A, 32B, 32C and 32D which are angularly spaced with respect to each other, preferably by a right angle as indicated in FIG. 2, and further by the tapered sidewall section 16 which connects the relatively large diameter cylindrical sidewall section 14 with a relatively narrow diameter cylindrical throat section 58. The tapered sidewall section 16 and the throat 58 define a flow restriction which induces turbulence in the swirling movement of combustion air and fuel vapor as indicated by the arrows 60. This produces a uniform mixture of air/vapor which is discharged through the throat 58 into the venturi 22 as indicated by the arrow 61.

It will be appreciated that the elongated fiber mesh wick 38 serves as a vapor/condensate reservoir from which a relatively large volume of fuel vapor can be obtained as needed according to most engine operating conditions. However, it is anticipated that the engine operating requirements for heavy loading conditions will exceed the capacity of the wick reservoir. Although the vapor generating capacity of the wick reservoir is more than adequate for idle and cruise conditions, additional fuel is discharged into the throat 62 of the venturi assembly 22 by an accelerator pump 64. Liquid fuel is conducted through a bore 66 which leads from the float bowl 26 to a pump cavity 68. The accelerator pump 68 is coupled to throttle linkage 70 which drives the pump reciprocally through the pump cavity 68, thereby displacing liquid fuel through a jet bore 72. According to this arrangement, raw fuel is aspirated through the venturi assembly 22 under heavy loading or accelerating conditions.

The flow of the air/vaporized fuel mixture is controlled by a butterfly valve 74. The accelerator pump 64 and butterfly valve 74 are controlled by simple throttle linkages which open the butterfly valve 74 to allow free passage of the fuel-air mixture into the intake manifold. The heat transfer level of the heating element 50 is also controlled by a simple throttle linkage which is coupled to a transducer in the heating element control circuit.

Under certain heavy loading conditions, it is desirable to discharge a metered quantity of water or water vapor into the flow path of the fuel/air mixture downstream of the mixing chamber 18. A measured amount of water or water vapor is discharged into the venturi assembly 22 by an injector nozzle 76. An increased charge density is provided by introducing fluid droplets into the fuel/air mixture at full throttle or high power operation. Because of the increase in the charge density, a supercharging effect is realized.

Figure 4:
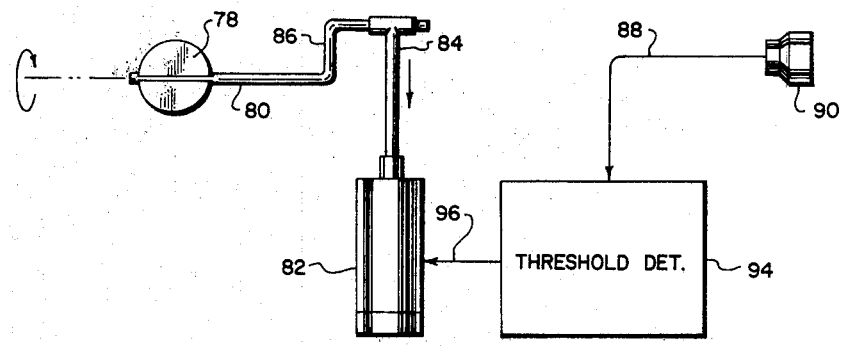
FIG. 4 is a block diagram of a safety closure assembly.

Because the fiber mesh wick 38 is saturated with fuel vapor, it is necessary to inhibit the propagation of flames from the intake manifold to the mixing chamber to prevent an explosion. The mixing chamber is automatically sealed with respect to the flow passage of the venturi assembly 22 by a safety closure plate in the form of a butterfly valve 78 mounted for rotation on a shaft 80 within the flow restriction throat 58. The safety closure butterfly valve 78 is illustrated in the opened position in FIG. 1, and is moveable to a closed position by a solenoid actuator 82 (FIG. 4). The solenoid actuator includes an actuator arm 84 which is moveable from a fully extended to a fully retracted position. The actuator arm 84 is coupled to the safety closure shaft 80 by suitable linkage 86. The linkage 86 is adjustable, as necessary, to produce complete sealing engagement or complete opening of the safety closure butterfly valve 78 in response to either full extension or full retraction of the actuator arm 84. The solenoid actuator is energized in response to an analog electrical signal 88 produced by a photosensor 90.

As can be seen in FIG. 1, the photosensor 90 is mounted on the venturi housing 92 and is aimed in boresight alignment with the venturi throat 62. According to this arrangement, flames propagating through the venturi passage 62 will be detected by the photosensor 90, thereby giving rise to the analog signal 88. As the amplitude of the analog signal 88 rises above a predetermined threshold, a detector circuit produces an actuating signal 96 which drives the safety closure butterfly valve 78 to its fully closed position, thereby protecting the mixing chamber 18 from exposure to flames propagated in response to a backfire in the intake manifold.

Although a preferred embodiment of the invention has been described in detail, it should be understood that various changes, substitutions and alterations can be made therein without departing from the spirit and scope of the invention as defined by the appended claims.

What is claimed is:

1. A carburetor for supplying a fuel/air mixture to an internal combustion engine of the type having an intake manifold, said carburetor comprising, in combination:
   an elongated tubular housing having sidewall portions defining a float bowl for receiving liquid fuel and an elongated vapor mixing chamber overlying and disposed in fluid communication with the float bowl, said tubular housing have a combustion air inlet port disposed in communication with the vapor mixing chamber at one end, and a fuel/air mixture outlet port disposed in communication with the mixing chamber at the opposite end;
   a fluid permeable wick assembly received within said housing and disposed between the float bowl and the mixing chamber;
   a heating element received within the housing for transferring heat to fuel in the float bowl;
   a closure valve movably disposed in the fuel/air mixture outlet;
   an electrical actuator having a movable arm coupled to the closure valve;
   a light sensitive transducer disposed in the fuel/air mixture flow path for generating a control signal in response to light emitted by flames propagating from the intake manifold; and,
   a threshold detector control circuit having an input coupled to the transducer and an output coupled to the actuator for driving the closure valve into sealing engagement with the fuel/air mixture outlet in response to a said control signal.

2. A carburetor for supplying a fuel/air mixture to an internal combustion engine; said carburetor comprising, in combination:
   an elongated tubular housing having sidewall portions defining a float bowl for receiving liquid fuel and an elongated vapor mixing chamber overlying and disposed in fluid communication with the float bowl, said tubular housing having a combustion air inlet port at one end and a fuel/air mixture outlet port at the opposite end;
   a tubular, fluid permeable wick assembly coaxially received within said tubular housing and interposed between said air inlet port and said vapor mixing chamber, said tubular wick assembly being radially spaced with respect to said elongated tubular housing thereby partitioning said vapor mixing chamber into an annular vapor flow passage between said housing and a central mixing chamber radially bounded by said wick assembly, said annular vapor flow passage being in communication with said float bowl, and said central mixing chamber being in communication with the fuel/air mixture outlet port; and, a heating element coupled to said housing for transferring heat to fuel in the float bowl.

* * * * *